(12) United States Patent
Imai

(10) Patent No.: US 8,665,355 B2
(45) Date of Patent: Mar. 4, 2014

(54) IMAGE CAPTURE WITH REGION-BASED ADJUSTMENT OF CONTRAST

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 532 days.

(21) Appl. No.: 12/952,188

(22) Filed: Nov. 22, 2010

(65) Prior Publication Data

US 2012/0127335 A1    May 24, 2012

(51) Int. Cl.
  *H04N 5/222*  (2006.01)
  *H04N 5/238*  (2006.01)

(52) U.S. Cl.
  USPC ..................... 348/333.02; 348/364

(58) Field of Classification Search
  None
  See application file for complete search history.

(56) References Cited

U.S. PATENT DOCUMENTS

| | | | |
|---|---|---|---|
| 4,754,332 A | 6/1988 | Bergquist | |
| 5,818,975 A * | 10/1998 | Goodwin et al. | 382/274 |
| 6,466,961 B1 | 10/2002 | Miller | |
| 6,781,713 B1 | 8/2004 | Gilman et al. | |
| 6,816,191 B1 * | 11/2004 | Shyu | 348/231.6 |
| 7,990,429 B2 * | 8/2011 | Saito | 348/222.1 |
| 8,525,899 B2 * | 9/2013 | Imai | 348/223.1 |
| 2003/0098922 A1 | 5/2003 | Barkan | |
| 2005/0270397 A1 * | 12/2005 | Battles | 348/333.01 |
| 2009/0160974 A1 | 6/2009 | Oyama | |
| 2009/0185039 A1 | 7/2009 | Hatanaka | |
| 2010/0044822 A1 | 2/2010 | Longoni et al. | |
| 2012/0069212 A1 * | 3/2012 | Imai | 348/223.1 |

OTHER PUBLICATIONS

F. Zaraga, et al., "White balance by tunable spectral responsivities", J. Opt. Soc. Am. A27, 31-39 (2010).
Boston Applied Technologies, Inc., "Focal Plane Array with Arbitrary Tunable Spectral Response", Air Force SBIR/STTR Innovation, (2009).
A. Longoni, et al., "The transverse field detector (TFD): A novel color-sensitive CMOS device", IEEE Electron Device Letters, 29, pp. 1306-1308, (2008).
U.S. Appl. No. 12/772,841, filed May 3, 2010, Applicant: Francisco Imai.
U.S. Appl. No. 12/789,323, filed May 27, 2010, Applicant: Francisco Imai.
U.S. Appl. No. 12/789,334, filed May 27, 2010, Applicant: Francisco Imai.
U.S. Appl. No. 12/859,115, filed Aug. 18, 2010, Applicant: Francisco Imai.
U.S. Appl. No. 12/871,826, filed Aug. 30, 2010, Applicant: Francisco Imai.

* cited by examiner

*Primary Examiner* — Justin P Misleh
(74) *Attorney, Agent, or Firm* — Fitzpatrick, Cella, Harper & Scinto

(57) ABSTRACT

Image capture with an image capture device including an imaging assembly having a spectral response which is tunable in accordance with a capture parameter. A first capture parameter is applied to the imaging assembly. A preview image of a scene is captured using the imaging assembly whose spectral response is tuned in accordance with the first capture parameter. A user interface is displayed by which first and second regions of the preview image are designated, and by which a target range is set for contrast between the first and second regions. A second capture parameter is derived for the imaging assembly, by implementing the target range for contrast between the first and second regions. The second capture parameter is applied to the imaging assembly. A second image of the scene is captured by using the imaging assembly whose spectral response is tuned in accordance with the second capture parameter.

33 Claims, 8 Drawing Sheets

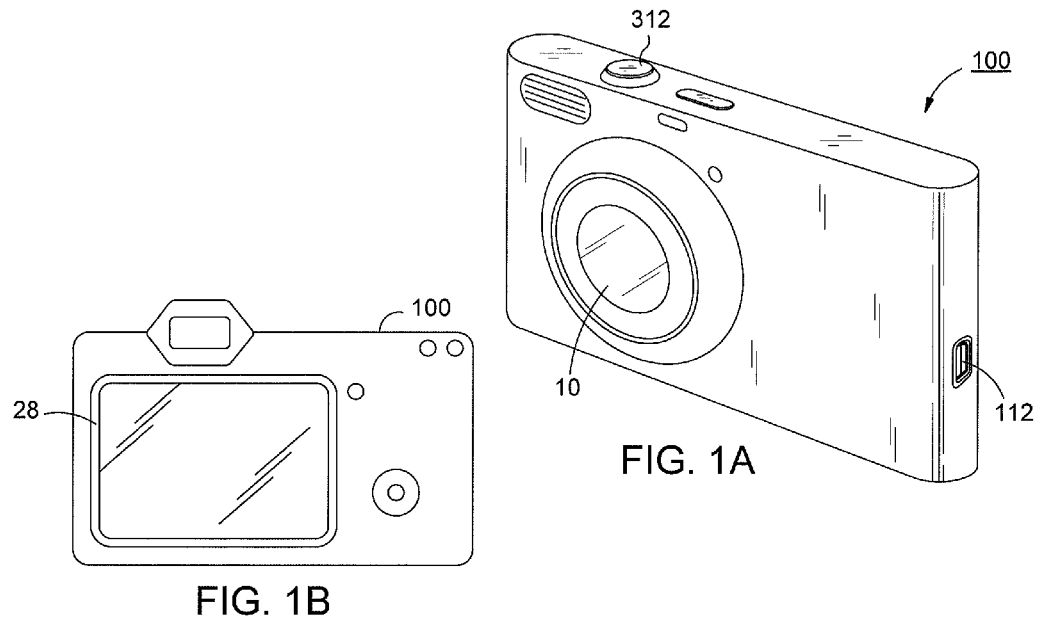
FIG. 1A
FIG. 1B
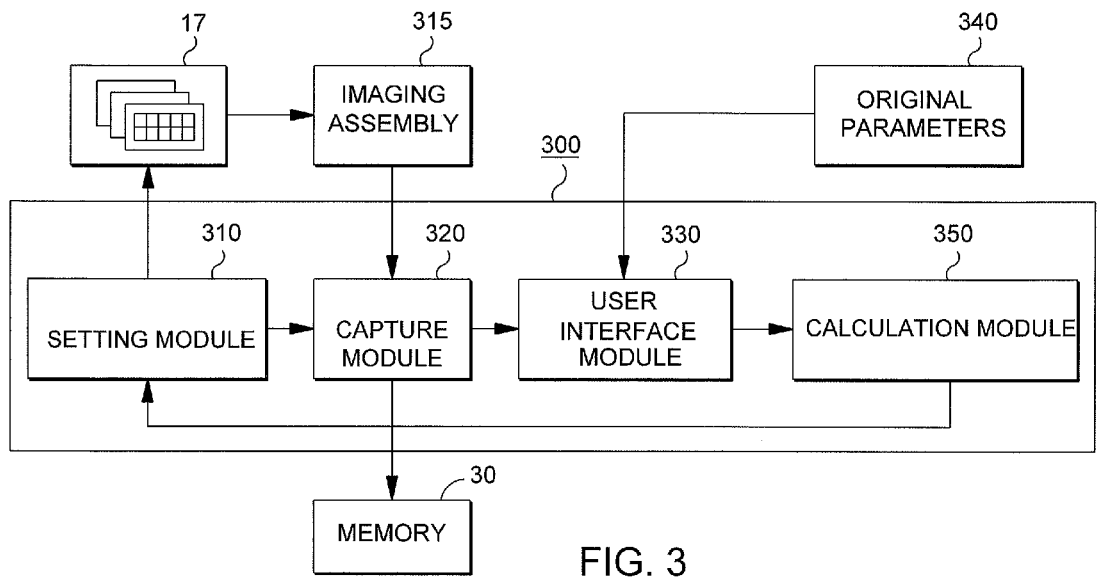
FIG. 3

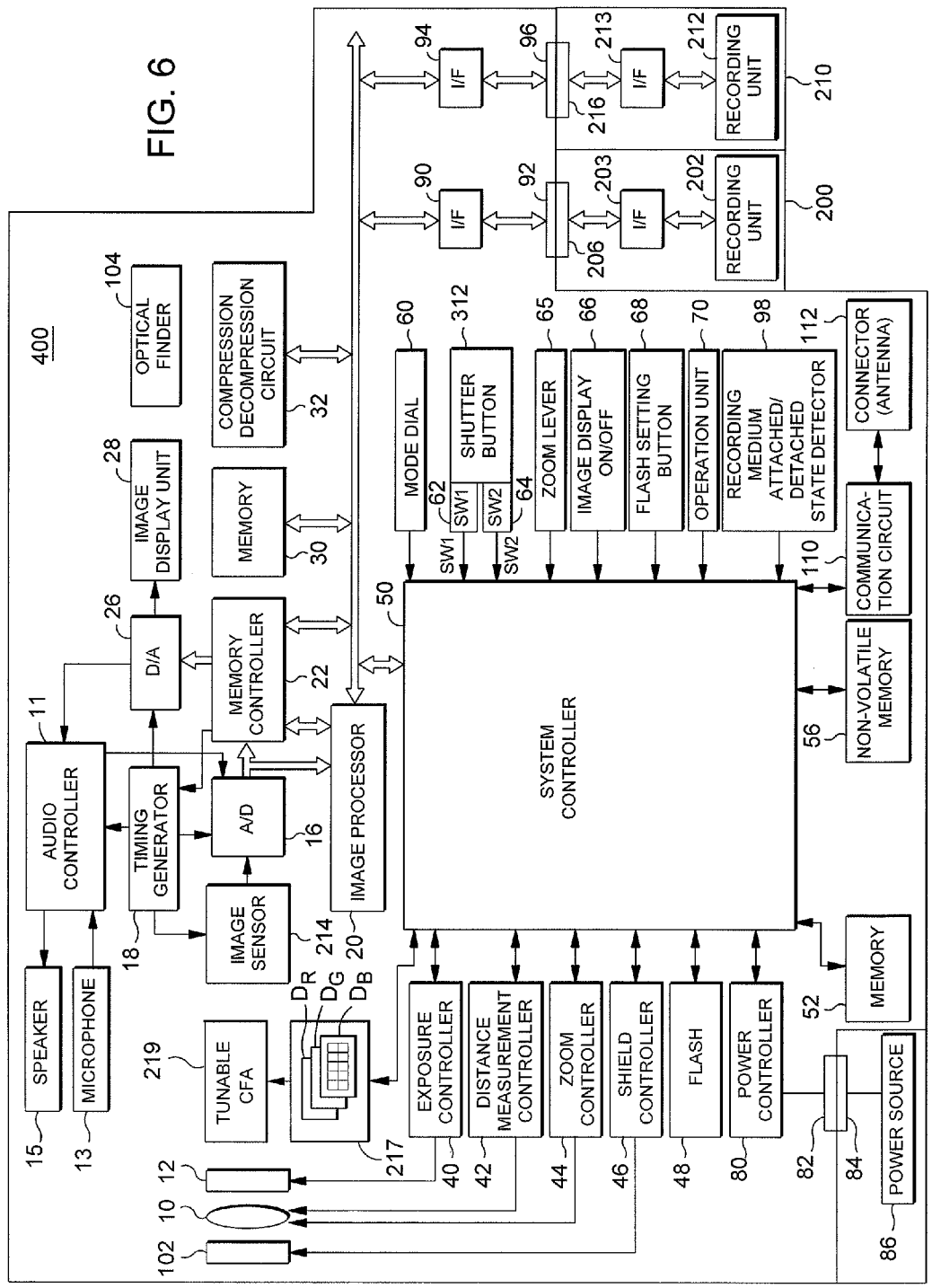

IMAGE CAPTURE WITH REGION-BASED ADJUSTMENT OF CONTRAST

FIELD

The present disclosure relates to image capture, and more particularly relates to adjustment of contrast for an image capture device.

BACKGROUND

In the field of photography, a photographer is often confronted with scenes that have extreme imaging properties, such as high dynamic range, unusual color balance, or large variations in contrast. Dynamic range typically refers to a ratio between maximum and minimum values of physical measurement, and in photography specifically refers to a ratio of luminance values. Color balance typically refers to intensities of colors in an image. Contrast is typically determined by the difference in the color and brightness of various objects or different regions within the same view.

In some cases, a scene including extreme imaging properties may have multiple different regions, each with different brightness levels and contrast. For example, a scene might include a first region depicting bright day light and a second region depicting dark shadow. In this situation, the first region depicting bright day light has a different brightness level than the second region depicting dark shadow. Moreover, in such a situation, the level of contrast is high, since the difference in the brightness level of the first region and the brightness level of the second region is large. On the other hand, in a situation where the brightness levels of the multiple different regions are relatively similar, the level of contrast is low, since the difference in the brightness levels is small.

When confronted with a scene having such dramatic variations in contrast, the photographer is often compelled to capture many images of the scene, each with different exposure settings, such as shutter speed. Then in post-capture image processing, the photographer combines the images into an acceptable rendition of the scene, such that an acceptable contrast is achieved. This acceptable rendition may not be achievable due to loss of information during capture that cannot be easily estimated or reconstructed.

SUMMARY

Recently, imaging assemblies have been developed in which the imaging assemblies have a tunable spectral response. Two examples of such imaging assemblies are described here. In the first example of imaging assemblies which have a tunable spectral response, there are imaging assemblies where the image sensor itself has a tunable spectral response. For instance, there is an image sensor described in "The Transverse Field Detector: A Novel Color Sensitive CMOS Device", Zaraga, IEEE Electron Device Letters 29, 1306-1308 (2008) and U.S. Patent Publication No. 2010/0044822, the contents of which are incorporated herein by reference. These documents describe a transverse field detector (TFD) which has a tunable spectral responsivity that can be adjusted by application of bias voltages to control electrodes. Each pixel outputs signals for a red-like channel, a green-like channel, and a blue-like channel.

In some of these image sensors, the spectral responsivity is tunable on a pixel by pixel basis or a region-by-region basis. Bias voltages are applied in a grid-like spatial mask, such that the spectral responsivity of each pixel is tunable individually of other pixels in the image sensor, or such that the spectral responsivity of each region comprising multiple pixels is tunable individually of other regions in the image sensor.

In the second example of imaging assemblies which have a tunable spectral response, there are imaging assemblies where the image sensor is preceded by a color filter array (CFA), and it is the color filter array that has a tunable spectral response. In the first example described above, because the image sensor itself has a tunable spectral response, it might be customary to omit a preceding color filter array, since the inclusion of any filter necessarily would decrease the signal-to-noise ratio by filtering the amount of light incident on the image sensor. In contrast, in this second example, the spectral responsivity of the image sensor is not necessarily tunable, but the spectral responsivity of a preceding color filter array is. For instance, there is a tunable color filter array described in U.S. Pat. No. 6,466,961 by Miller, "Methods for Adaptive Spectral, Spatial and Temporal Sensing for Imaging Applications", the content of which is incorporated herein by reference. This document describes an imaging assembly comprising a color filter array which precedes an image sensor whose spectral responsivity is constant, but in which the color filter array itself has a tunable spectral responsivity that can be adjusted by application of bias voltages to control electrodes. Each array element thus filters light incident on corresponding pixels of the image sensor, and the image sensor thereafter outputs signals from which a red-like channel, a green-like channel, and a blue-like channel, can all be derived for each pixel. In the case of a color filter array with temporal sensing, the channels for each pixel may be output sequentially, one after the other. In the case of a color filter array with spatial sensing, the channels for each pixel may be output simultaneously or nearly so, although demosaicing might be required depending on the geometry of the color filter array.

In some of these color filter arrays, the spectral responsivity is tunable on a pixel by pixel basis or a region-by-region basis. Bias voltages are applied in a grid-like spatial mask, such that the spectral responsivity for each pixel is tunable individually of other pixels, or such that the spectral responsivity for each region comprising multiple pixels is tunable individually of other regions.

According to an aspect of the disclosure herein, an image capture device is provided with an imaging assembly configured to capture an image and acquire image data. The imaging assembly has tunable sensitivities controlled by a capture setting, such as voltages applied to each pixel of an image sensor which has tunable responsivity, or such as voltages that are applied to each array element of a color filter array which has tunable responsivity. The sensitivities for each pixel are thereby adjusted in accordance with a spatial mask.

Thus, in an example embodiment described herein, an image capture device includes an imaging assembly which has a spectral response which is tunable in accordance with a capture parameter. A first capture parameter is applied to the imaging assembly, and a preview image of a scene is captured using the imaging assembly whose spectral response is tuned in accordance with the first capture parameter. A user interface is displayed by which first and second regions of the preview image are designated, and by which a target range is set for contrast between the first and second regions. A second capture parameter is derived for the imaging assembly, wherein the second capture parameter is derived by computations which implement the target range for contrast between the first and second regions. The second capture parameter is applied to the imaging assembly, and a second image of the scene is captured by using the imaging assembly whose spectral response is tuned in accordance with the second capture parameter.

By virtue of this arrangement, it is ordinarily possible to capture an image of a scene based on contrast properties for each designated region as selected by a user. For example, it is typically possible for a user to select contrast properties such that the image is captured with good exposure. In addition, it is ordinarily possible to do so with a single image capture operation, even for difficult scenes such as scenes with multiple regions having different levels of contrast.

In one example embodiment, a user interface is displayed by which a user is permitted to designate a single region in the preview image or two regions in the preview image. In the case that a single region is designated, the single region is segmented into the first region and the second region by discrimination between high and low illumination regions in the single region. In the case that two regions are designated, the two regions are designated as the first and second regions, respectively.

In some example embodiments, a user interface is displayed which includes an indication of brightness range for each of the first and second regions, and a user manipulation of each of the brightness ranges is accepted so as to set the target range for contrast between the first and second regions. In other example embodiments, a user interface is displayed which includes an indication of contrast range for contrast between the first and second regions, and a user manipulation of the contrast range is accepted so as to set the target range for contrast between the first and second regions.

In one example embodiment, deriving a second capture parameter includes calculating original brightness parameters for the first and second regions based on the preview image, calculating modification brightness parameters for the first and second regions based on the target range set for contrast between the first and second regions, and modifying the first capture parameter by comparing the original brightness parameter and the modification brightness parameters.

In some example embodiments, the second capture parameter is applied to the imaging assembly, and a second preview image of the scene is captured using the imaging assembly whose spectral response is tuned in accordance with the second capture parameter. In this case, a user interface is displayed by which first and second regions of the second preview image are designated, and by which the target range is set for contrast between the first and second regions. A third capture parameter is derived for the imaging assembly, wherein the third capture parameter is derived by computations which implement the target range for contrast between the first and second regions. The third capture parameter is applied to the imaging assembly, and a third image of the scene is captured by using the imaging assembly whose spectral response is tuned in accordance with the third capture parameter. In one example embodiment, the third image is stored in a memory of the image capture device as a final capture of the scene. In some example embodiments, the second image is stored in a memory of the image capture device as a final capture of the scene.

According to one example embodiment, the first and second capture parameters each comprise a spatial mask by which spectral responsivity of the first region is tuned independently of spectral responsivity of the second region.

In some example embodiments, the imaging assembly comprises an image sensor which has a tunable spectral response. In other embodiments, the imaging assembly comprises an image sensor and a preceding color filter array which has a tunable spectral response.

This brief summary has been provided so that the nature of this disclosure may be understood quickly. A more complete understanding can be obtained by reference to the following detailed description and to the attached drawings.

BRIEF DESCRIPTION OF THE DRAWINGS

FIGS. 1A and 1B are representative views for explaining the exterior appearance of an image capture device relevant to one example embodiment.

FIG. 3 is a view for explaining software architecture of the image capture device shown in FIG. 1 according to one example embodiment.

FIG. 6 is a detailed block diagram for explaining the internal architecture of an image capture device according to one example embodiment.

DETAILED DESCRIPTION

<FIGS. 1 to 5>

Figure 2A:
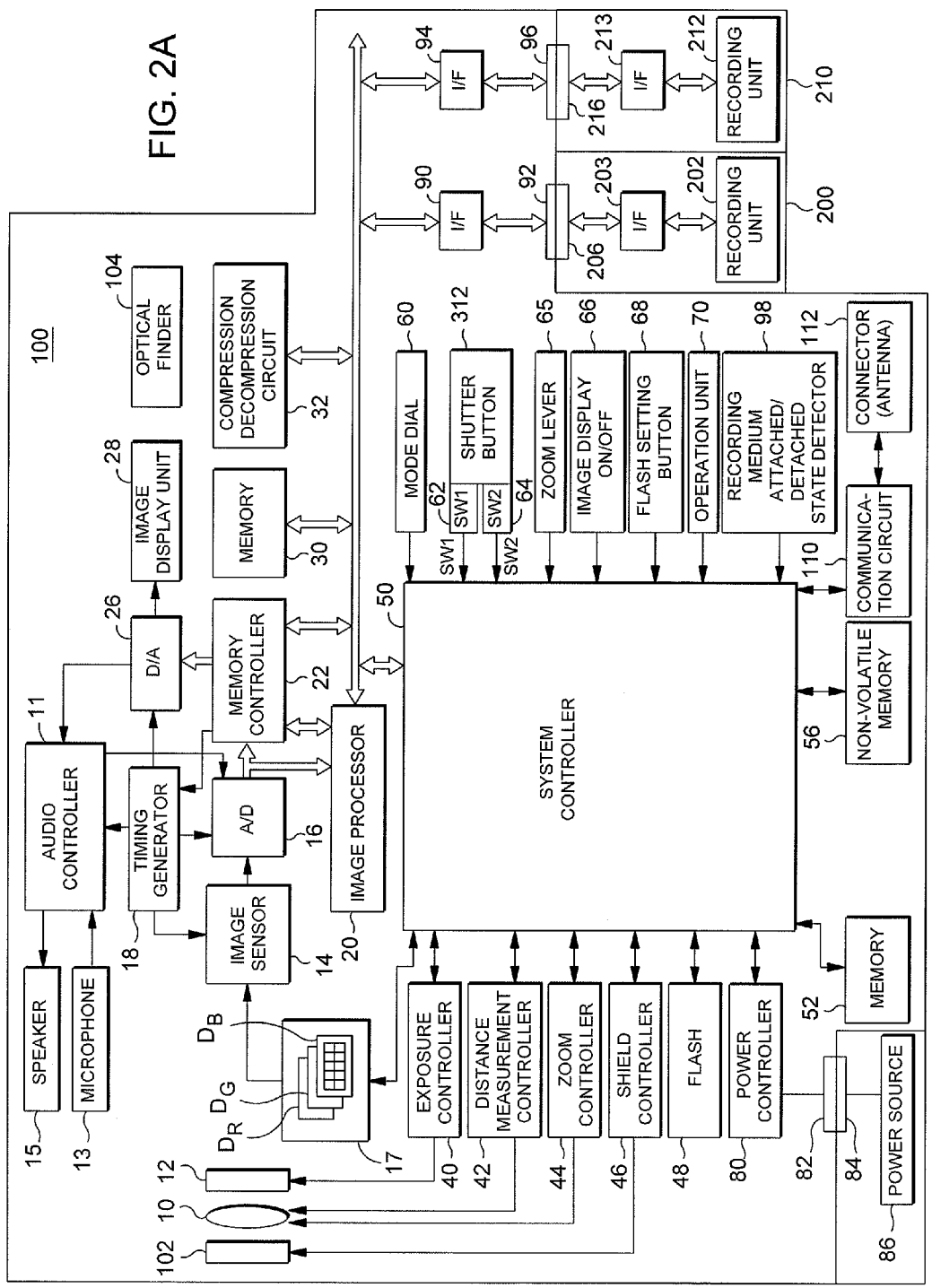
FIGS. 2A and 2B are detailed block diagrams for explaining the internal architecture of the image capture device shown in FIG. 1 according to one example embodiment.

FIGS. 1A and 1B are representative views for explaining the exterior appearance of an image capture device relevant to one example embodiment. Note in these figures, some components are omitted for description purpose. As shown in FIGS. 1A and 1B, image capture device 100 is constructed as an embedded and hand held device including a optical system 10 and a connector 112 for connection to external devices. In the embodiment of FIGS. 1A and 1B, interface connector 112 is a USB interface connector, but other wired and wireless interfaces may be used.

Image capture device 100 further includes a variety of user interfaces for permitting a user to interact therewith, such as shutter release 312, an image display unit 28 for displaying menus and thumbnail images, and a series of selector buttons for permitting display and selection of menu items.

While FIGS. 1A and 1B depict one example embodiment of image capture device 100, it should be understood that the image capture device 100 may be configured in the form of, for example, a digital camera, a video camera, or any type of device including a camera, such as a pager, a cellular telephone, a radio telephone, a personal computer, a personal digital assistant (PDA), a Moving Pictures Expert Group Layer 3 (MP3) player, and/or the like.

FIG. 2A is a detailed block diagram for explaining the internal architecture of the image capture device 100 shown in FIG. 1 according to one example embodiment. Referring to FIG. 2A, reference numeral 10 denotes an imaging lens; 12, a shutter having an aperture function; and 14, an image sensor which has a spectral response which is tunable in accordance with a capture parameter, which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2A, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 is an image sensor which has a spectral response which is tunable in accordance with a capture parameter 17. For each pixel, image sensor 14 outputs three or more channels of color information, including a red-like channel, a green-like channel and a blue-like channel. The precise nature of the spectral responsivity of image sensor 14 is controlled via capture parameter 17. In this embodiment, capture parameter 17 may be comprised of multiple spatial masks, with one mask each for each channel of information output by image sensor 14. Thus, in this example, where image sensor 14 outputs three or more channels, capture parameter 17 includes a spatial mask DR for the red-like channel of information, a spatial mask DG for the green-like channel of information, and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 312 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
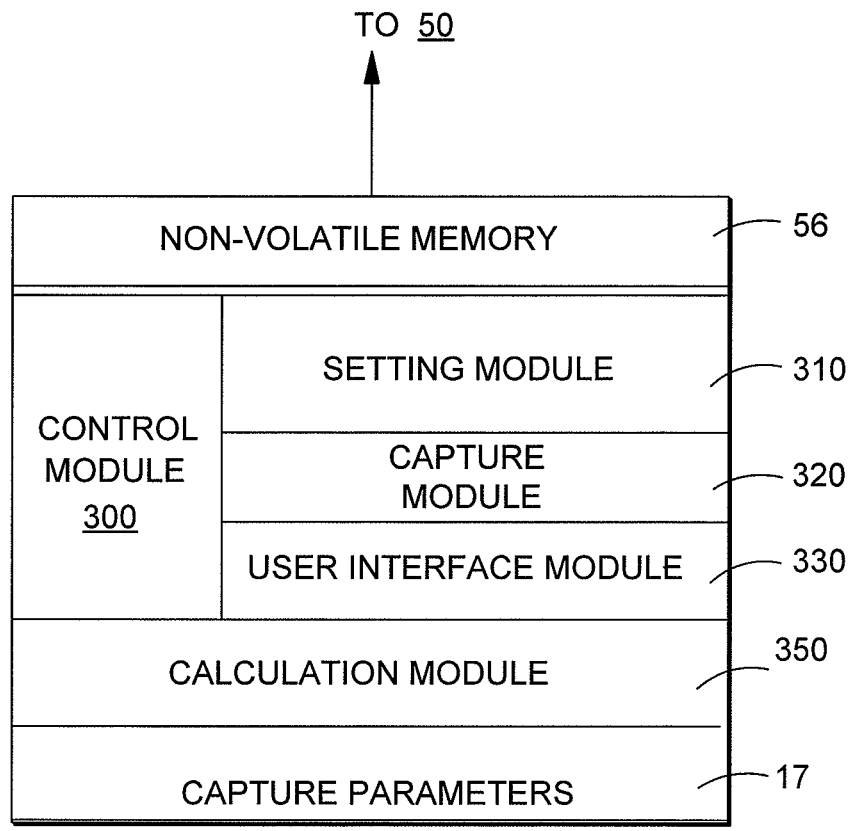

In particular, and as shown in FIG. 2B, non-volatile memory 56 is an example of a non-transitory computer-readable memory medium, having stored thereon control module 300 as described herein. According to this example embodiment, the control module 300 includes at least setting module 310, capture module 320, user interface module 330 and calculation module 350. Briefly, the setting module 310 comprises computer-executable process steps executed by a computer for applying capture parameters, such as first and second capture parameters, to the imaging assembly. The capture module 320 comprises computer-executable process steps executed by a computer for capturing a preview image of the scene using the imaging assembly whose spectral response is tuned in accordance with capture parameters. The user interface module 330 comprises computer-executable process steps executed by a computer for displaying a user interface by which first and second regions of the preview image are designated, and by which a target range is set for contrast between the first and second regions. Calculation module 350 comprises computer-executable process steps executed by a computer for computing a second capture parameter for the imaging assembly, by computations which implement the target range for contrast between the first and second regions. These modules will be discussed in more detail below with respect to FIG. 3.

Also stored on non-volatile memory 56 are pre-designated capture parameters 17 for application to image sensor 14 so as to control spectral responsivity of the imaging assembly. In this embodiment, the capture parameters 17 are comprised of spatial masks so as to permit pixel-by-pixel or region-by-region control of spectral responsivity, independently of other pixels or regions.

Reference numeral 50 denotes a system controller, which controls the entire digital camera 100. The system controller 50 executes programs recorded in the aforementioned nonvolatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 312, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 312 arranged on the digital camera 100, and generates a first shutter switch signal SW1. Also, the shutter switch 64 is turned on upon completion of operation (full stroke) of the shutter button 312, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on, which are not shown in FIG. 2A. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

FIG. 3 is a view for explaining software architecture of the image capture device 100 of FIG. 1 according to one example embodiment. As previously discussed with respect to FIG. 2B, control module 300 comprises computer-executable process steps stored on a non-transitory computer-readable storage medium, such as non-volatile memory 56. In this example embodiment, as shown in FIG. 3, control module 300 includes computer-executable process steps for at least the setting module 310, the capture module 320, the user interface module 330, and the calculation module 350.

The setting module 310 is constructed to apply capture parameters 17 to the imaging assembly 315 which includes tunable image sensor 14 for setting the spectral response of the tunable imaging assembly to a setting. More specifically, for example, setting module 310 applies a first or second of capture parameters 17 to the tunable image sensor 14. As another example, setting module 310 applies a default capture parameter to the imaging assembly 315 including tunable image sensor 14. In this example embodiment, the default capture parameter is provided by image capture device 100 automatically, based on scene elements in the ROI. In other example embodiments, the default capture parameter is provided in any suitable manner, including, for example, by user specification or by the manufacturer.

The capture module 320 is constructed to capture image data of a scene from the imaging assembly 315 using the capture parameter 17 applied by the setting module 310. Image data which is captured by the imaging assembly 315 is stored in memory 30. In particular, in this example embodiment, imaging assembly 315 comprises tunable image sensor 14, such that the image data of the scene is captured using tunable image sensor 14 and stored in memory 30.

The user interface module 330 is constructed to display a preview of the captured image of the scene as well as various user interfaces. In this embodiment, the preview of the scene is captured using imaging assembly 315 tuned in accordance with capture parameters such as first and second capture parameters. In particular, in this example embodiment, imaging assembly 315 comprises tunable image sensor 14, such that the preview image is captured using tunable image sensor 14.

User interface module 330 is constructed to accept designation of first and second ROIs in the preview image, and to accept a user selection of a target range for contrast between the ROIs, via user manipulation of the user interface. More specifically, using the user interface, a user is permitted to designate a single region in the preview image or two regions in the preview image. Responsive to a designation of a single region in the preview image, the single region is segmented into the first region and the second region by discrimination between high and low illumination regions in the single region. On the other hand, responsive to a designation of two regions, the two regions are designated as the first and second regions, respectively.

In one example embodiment, the user interface module 330 displays brightness ranges, such as brightness histograms, of the preview image data and accepts a user manipulation of the brightness ranges so as to set the target range for contrast between the first and second ROIs. In other embodiments, user interface module 330 displays a contrast range, such as a contrast histogram, and accepts manipulation of a contrast range so as to set the target range for contrast between the first and second regions. In still other embodiments, user interface module 330 displays a numerical value for brightness and/or contrast parameters.

Calculation module 350 comprises computer-executable process steps stored on a non-transitory computer-readable storage medium, such as non-volatile memory 56. Calculation module 350 computes a revised capture parameter for the imaging assembly 315, based on the target range for contrast set by the user. The revised capture parameter is provided to image capturing spatial mask setting module 310 for application to image sensor 14, such that image sensor 14 is tuned in accordance with the revised capture parameter.

Figure 4:
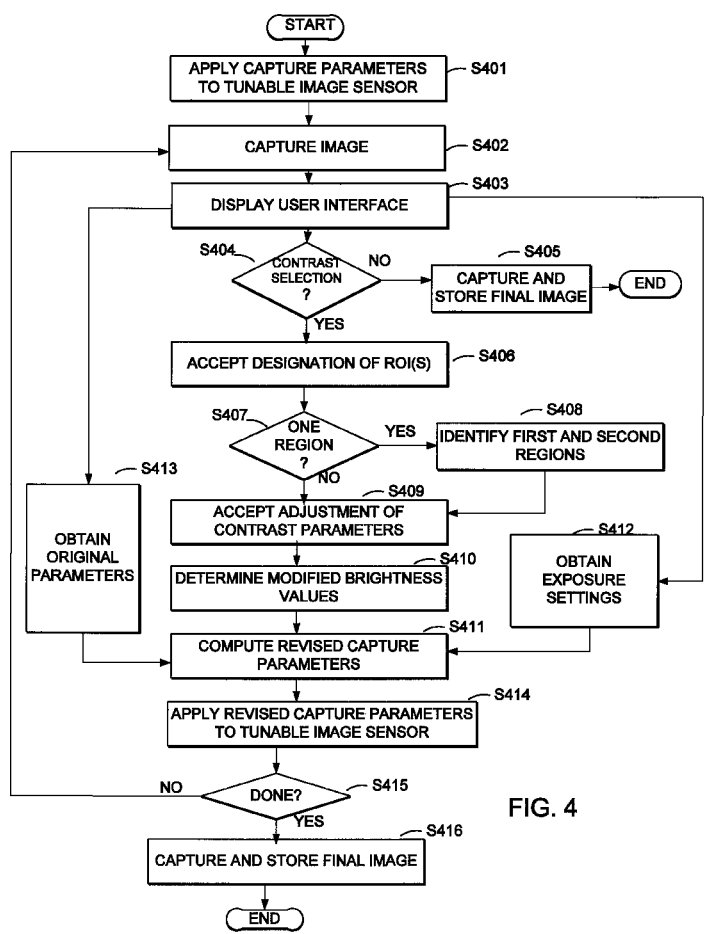
FIG. 4 is a flow diagrams for explaining processing in the image capture device shown in FIG. 1 according to one example embodiment.

FIG. 4 is a flow diagram for explaining processing in the image capture device shown in FIG. 1 according to one example embodiment. Briefly, according to FIG. 4, a first capture parameter is applied to the imaging assembly including tunable image sensor, and a preview image of the scene is captured using the imaging assembly including tunable image sensor whose spectral response is tuned in accordance with the first capture parameter. A user interface is displayed by which first and second regions of the preview image are designated, and by which a target range is set for contrast between the first and second regions. A second capture parameter is derived for the imaging assembly including tunable image sensor, wherein the second capture parameter is derived by computations which implement the target range for contrast between the first and second regions. The second capture parameter is applied to the imaging assembly including tunable image sensor, and a second image of the scene is captured by using the imaging assembly including tunable image sensor whose spectral response is tuned in accordance with the second capture parameter.

In more detail, the process shown in FIG. 4 starts with application of a first capture setting, then capturing an image using the first capture setting. The image is captured and displayed on the image display unit 28 by a half stroke of shutter switch (SW1) 62 before the shutter switch (SW2) 64 is switched on by a full stroke of the shutter button by a user of the image capture device 100.

As shown in FIG. 4, in step S401, setting module 310 applies a first capture setting to the tunable image sensor 14 for setting the spectral response of the tunable imaging assembly to a predesignated default setting. In this embodiment, the first capture setting comprises an electronic spatial mask which individually tunes each pixel or each region of plural pixels in tunable image sensor 14. In this example embodiment, the first capture setting is automatically determined by the image capture device based on predesignated settings.

In step S402, capture module 320 captures preview image data of a scene from the image sensor 14 using the first capture setting applied by the setting module 310, according to this example embodiment. In other example embodiments, image capture device 100 automatically determines a color balance for the preview image data, and automatically derives a capture setting for the preview image data to be applied to image sensor 14. In this case, capture module 320 captures preview image data of a scene using the capture setting automatically derived by image capture device 100.

Figure 5A:
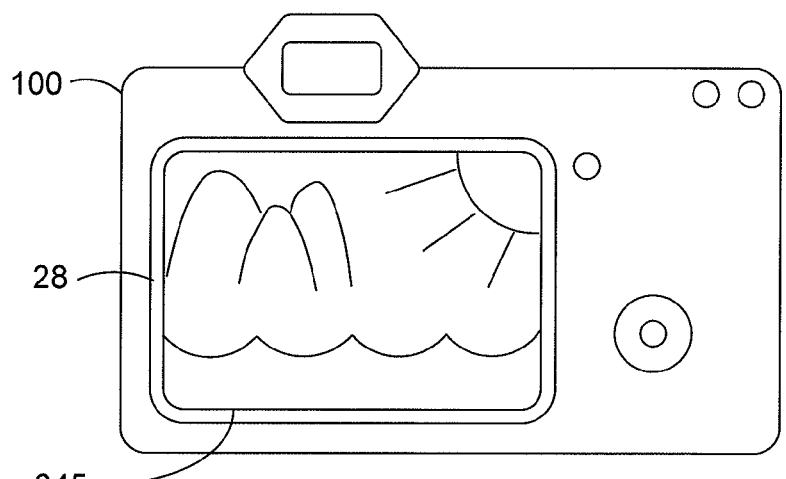
FIG. 5A is a view for explaining display of a preview image by the image capture device shown in FIG. 1 according to one example embodiment.

In step S403, user interface module 330 displays a user interface which includes a preview image based on the captured preview image data of the scene, for example, as shown in FIG. 5A. In particular, FIG. 5A shows a rear view of image capture device 100 having image display unit 28. According to this example embodiment, image display unit 28 displays the preview image 245 based on image data of a scene captured in step S402. In some example embodiments, the display in step S403 includes ranges for imaging properties of the preview image, in addition to the preview image. In this case, the imaging property ranges for the preview image, such as histograms or slide bars, are displayed together with the preview image.

At this time, user interface module 330 also displays a user interface including a selection of a contrast selection mode, and accepts a user selection of the contrast selection mode. Contrast selection mode allows the user to select ROIs and values of contrast parameters for the ROIs.

In step S404, it is determined whether contrast selection mode has been selected. If it is determined that the user has not selected contrast selection mode ("NO" at step S404), the capture module 320 captures image data using the first capture setting at step S405 and stores the captured image data in memory 30.

Figure 5B:
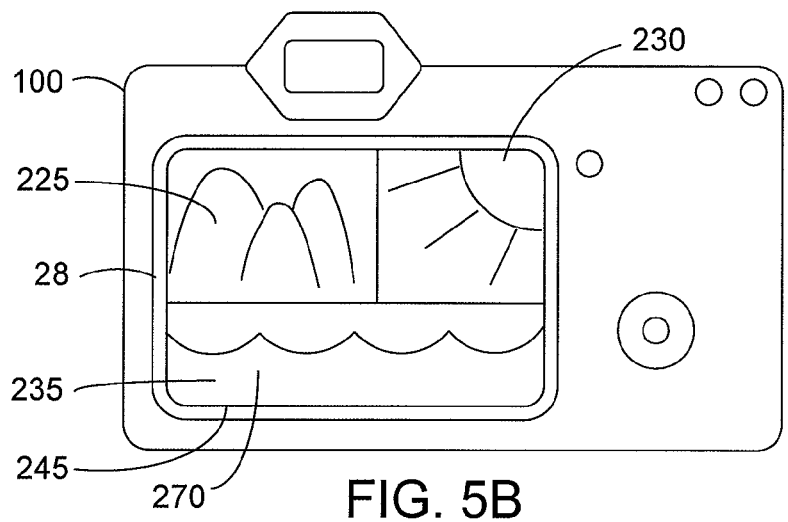
FIG. 5B is a view for explaining acceptance of a designation of regions of interest according to one example embodiment.

On the other hand, if it is determined that the user has selected contrast selection mode ("YES" at step S404), the user interface module 330 accepts the designation of the ROIs in the preview image at step S406, for example, as shown in FIG. 5B. FIG. 5B is a view for explaining acceptance of a designation of the ROI. As shown in FIG. 5B, the preview image 245 displayed on the image display unit 28 depicts a preview image divided into a plurality of regions. In particular, the preview image includes three regions, such as regions 225, 230, 235. In region 225 of the preview image, a landscape of mountains in the background is displayed. In region 230, the sun is displayed. In region 235, a body of water is displayed.

In this example embodiment, the user interface module 330 accepts the user designation of the ROI in the preview image, for example, as shown in FIG. 5B. In this embodiment, the image display unit 28 is a touch screen, and the user designates ROI 225, 230, or 235 by contacting the region of the image 245 displayed on the image display unit 28. In other embodiments, the ROI is designated by the user through an input via a button associated with the operation unit 70 which is then relayed to the system controller 50, or by voice command.

When an ROI is designated, user interface module 330 determines the pixels of the image which are included in the ROI. This determination may be made, for example, by using a spatial filtering algorithm or by grouping pixels having substantially the same illumination. In other example embodiments, user interface module 330 divides the preview image 245 into regions 225, 230 and 235 before the user interface module 330 accepts the user designation of the ROI. In this case, the user of the image capture device selects the quantity of regions to divide the displayed image. In some embodiments, the number of regions the image is divided into is based on the number of different illuminants associated with the scene that is captured. For example, if the displayed image includes two different illuminants, the user divides the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

In some embodiments, timing also plays a role in the designation of regions. For example, according to one example embodiment, if a user touches a first ROI and touches a second ROI at a later time including a significant delay, such as 2 seconds, the first ROI is discarded and only the second ROI is considered to be designated by the user for contrast adjustment. In this case, the second ROI is considered to be a single region designated by the user for contrast adjustment, and the system controller will segment the single region into first and second regions. Segmentation of the single region is performed, for example, by executing a spatial filtering algorithm to identify elements in the single region, or by discrimination between high and low illumination regions in the single region.

In other example embodiments, in the same situation, the first ROI is retained despite the significant delay. In this case, the first and second ROIs are considered to be designated as two regions for contrast adjustment, and the first and second ROIs are designated as the first and second regions, respectively, for contrast adjustment.

In still other embodiments, the user must touch the first and second ROIs simultaneously in order to designate two regions for contrast adjustment. In this way, the user is permitted to designate either a single region or two regions in the preview image according to this example embodiment.

In some example embodiments, the user is permitted to designated more than two regions in the preview image. In this case, a hierarchy is generated for the numerous regions based on, for example, the median value of brightness for the particular region. More specifically, a hierarchy is generated such that pairs regions are designated for contrast adjustment in turn.

Turning to step S407, it is determined whether the user has designated one region or two regions in step S406. As discussed above, responsive to a designation of a single region in the preview image ("YES" at step S407), the single region is segmented into the first and second regions in step S408 by identifying elements within the region, or by discriminating between high and low illumination regions in the single region. In particular, user interface module 330 groups pixels having substantially high illumination into a first region, and groups pixels having substantially low illumination into a second region.

On the other hand, if it is determined that the user has designated more than one region ("NO" at step S407), for example, responsive to a designation of two regions, the two regions are designated as the first and second regions, respectively, for contrast adjustment. In this case, the first region is identified as a region having substantially high illumination, i.e. a light region, and the second region is identified as a region having substantially low illumination, i.e. a dark region.

Figure 5C:
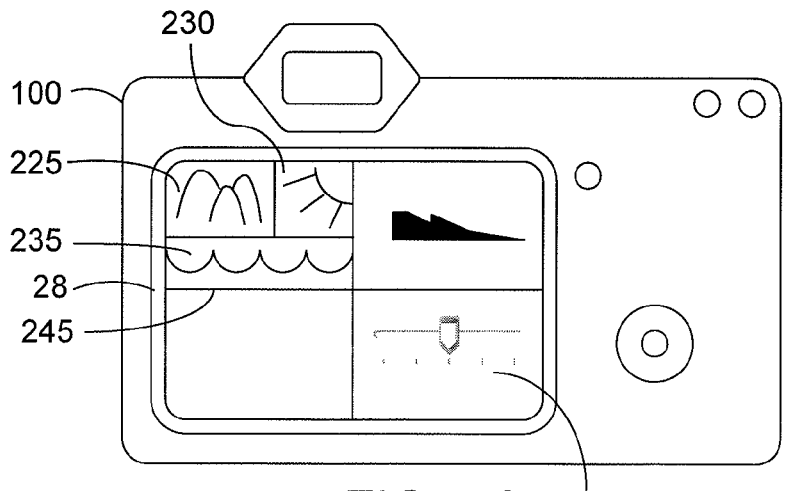
FIGS. 5C to 5E are views for explaining acceptance of a selection of a targeted imaging property according to one example embodiment.
Figure 5D:
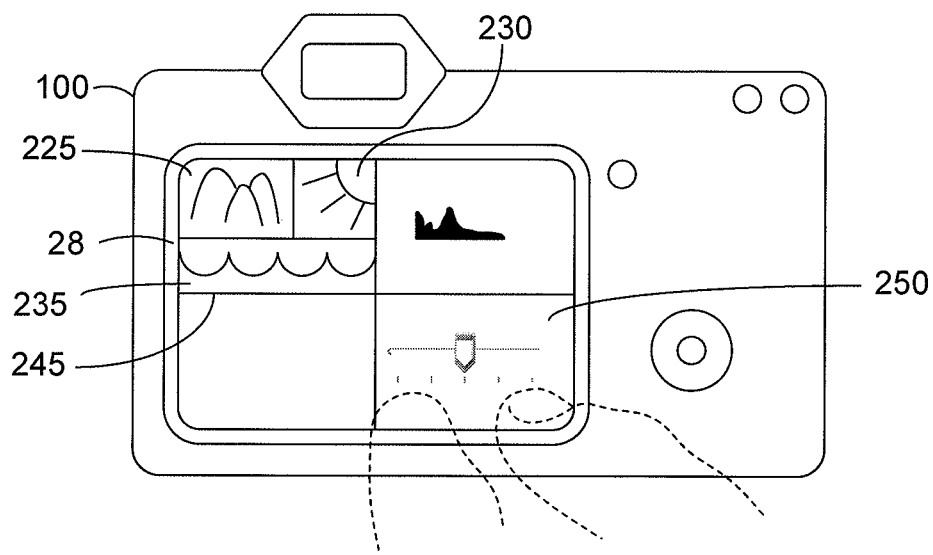
Figure 5E:
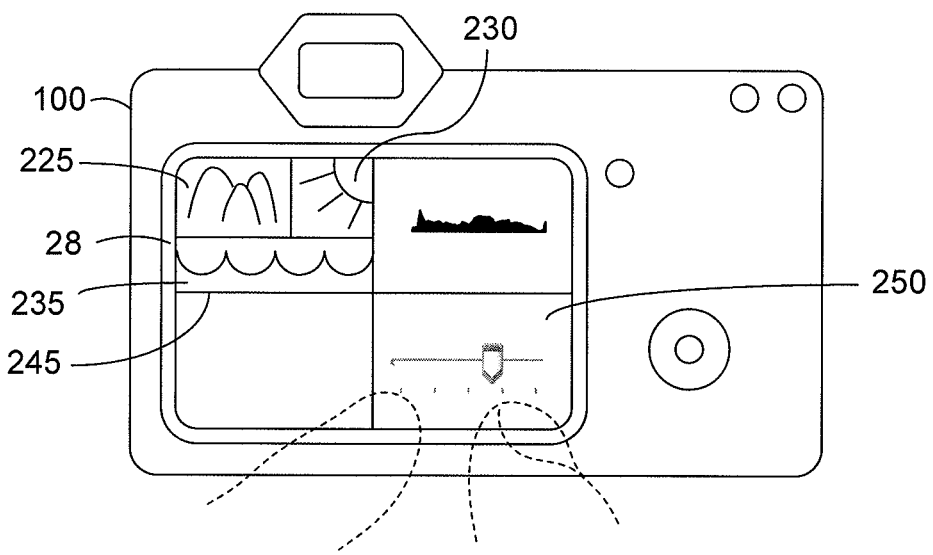

In step S409, user interface module 330 accepts a user setting of a target range for contrast for contrast between the first and second regions, for example, as shown in FIGS. 5C to 5E. In particular, FIGS. 5C to 5E are examples of user interfaces including contrast range 250, which effect the selection of the target range for contrast parameters. Generally, in this case, capture parameters for the ROIs are adjusted based on the user selection of the target contrast range set via the contrast range displayed by the user interface. More specifically, when the target contrast range is set by the user using a contrast range such as contrast range 250, the corresponding brightness levels for each ROI are subsequently derived, for example, by using predesignated algorithms or look up tables stored in the memory 56. In one example embodiment, if the contrast range is increased, the brightness values for the region identified as having a low illumination are set to be relatively lower (darker), and the brightness values for the region identified as having a high illumination are set to be relatively higher (brighter). If the contrast range is decreased, the brightness values for the region identified as having low illumination are set to be relatively higher (brighter), and the brightness values for the region identified as having high illumination are set to be relatively lower (darker). In other example embodiments, the brightness values of a first region are anchored such that they are unchanged, and the brightness values of a second region are adjusted in order to set the target contrast range.

As shown in FIG. 5C, image display unit 28 displays on the user interface a contrast range 250 of the image data 245 previewed on image display unit 28. By manipulating the contrast range 250 as shown in FIGS. 5D and 5E, the user effects the selection of the target contrast range for contrast between the designated first and second regions. In some example embodiments, the user interface displays a contrast range 250 including brightness values which fall within a tunable range of the imaging assembly. With this arrangement, the user advantageously specifies the contrast range associated with specific regions of interest in the image 245 displayed on the image display unit 28, rather than making a global adjustment to the entire image 245 displayed on the image display unit 28. Furthermore, the user advantageously specifies the contrast range based on any suitable criteria, including, for example, a lookup table and/or aesthetic concerns.

In this example embodiment, the image display unit 28 displays on the user interface a contrast range 250 of the image data previewed on image display unit 28, and a user manipulation of the contrast range is accepted so as to set the target range for contrast between the first and second ROIs. According to this example embodiment, the contrast range is displayed as a slide bar. In other example embodiments, the contrast range is displayed as a contrast histogram, a dial, a button, or any other type of suitable representation. By manipulating the contrast range, the user effects the selection of the target range for contrast for the first and second regions of interest. With this arrangement, the user selects the target range for contrast between the designated regions of interest, typically with ease and simplicity.

In other example embodiments, the image display unit 28 displays on the user interface a brightness range for each of the first and second regions, and accepts user manipulation of each of the individual brightness ranges so as to effect the desired contrast between the first and second regions. In this case, it is typically helpful for the user to have some knowledge regarding the numerical brightness values of the regions, and the effect of the brightness values on contrast. Thus, one advantage of using a contrast range rather than separate brightness ranges is that the user does not ordinarily need to have access to such information.

With this arrangement, the user advantageously specifies the contrast parameters associated with specific regions of interest in the image displayed on the image display unit 28, rather than making a global adjustment to the entire image displayed on the image display unit 28. Furthermore, the user advantageously specifies the contrast parameters based on any suitable criteria, including, for example, a lookup table and/or aesthetic concerns.

The user interfaces depicted in FIGS. 5A to 5E are merely examples of user interfaces which can be displayed by user interface module 330 according to this example embodiment. It should be understood that other types of suitable interfaces can also be displayed.

In step S410, calculation module 350 determines the modified values of the brightness values for each ROI, based on the user selection of the target contrast range in step S409. More specifically, the appropriate brightness values for each of the first and second ROIs are calculated in accordance with the target contrast range set by the user by, for example, using a previously stored algorithm or a lookup table. In the case that the user interface displays a contrast range for the contrast between the first and second ROIs, the modified brightness values are derived for each ROI in order to achieve the target contrast range. In the case that the user interface displays brightness ranges for each of the first and second ROIs, the brightness values are calculated directly from the values set by the user via the user interface.

In step S413, calculation module 350 obtains original parameters 340 for the first and second ROIs from memory 56. Original parameters 340 are statistical values of the imaging properties that characterize the ROI before adjustment by the user. For example, the original imaging property values may be a median of the brightness values for the designated ROIs, or median values for red, green and blue color channels. In this example embodiment, the original imaging property values are previously stored by the image capture device 100 when image capturing module 320 captures image data of a scene from the image sensor 14, for example, in memory 56. In this case, user interface module 330 accesses memory 56 in order to obtain the original parameters 340 for the ROIs.

In step S412, calculation module 350 obtains the exposure settings of image capture device 100. In this regard, the exposure settings of image capture device 100 are the settings that are provided to exposure controller 40 to control the amount of light that will reach image sensor 14. The exposure settings of image capture device 100 are previously determined by the image capture device 100 according to a predesignated default determined by AE processing, or alternatively are selected by a user. The exposure settings are stored in a memory, such as memory 56, and accessed by calculation module 350 in order to calculate the appropriate setting for the selected target contrast range. For example, in some cases, the imaging assembly adjusts the length of exposure based on the selection of the target contrast range by the user.

In step S411, calculation module 350 computes a second capture parameter for the spectral responsivity of the tunable image sensor 14, by revising the first capture setting based on the target contrast range for the ROIs as selected by the user. In this embodiment, the revised capture setting comprises an electronic spatial mask. Generally, the calculation module 350 computes the second capture setting based on the obtained original parameters 340 for the first and second ROIs, the exposure settings of image capture device 100, and the modified brightness values for the first and second ROIs which are calculated from the user selection of the target contrast range in step S409.

More specifically, the second capture setting for the spectral responsivity of the tunable image sensor 14 is computed by revising the first capture setting based on the target range for contrast for the ROIs as selected by the user. In this case, the first capture setting is revised by computing a brightness change parameter based on a comparison of original brightness values in the preview image data with the modified brightness values for the ROIs, and combining the brightness change parameter with the first capture setting so as to compute the second capture setting. In particular, computing the brightness change parameter comprises calculating a difference between the original brightness values in the preview image data and the modified brightness values for the ROIs. In this case, the second capture setting comprising the electronic spatial mask is generated by associating the brightness change parameters with bias voltages for the electronic spatial mask.

In step S414, the setting module 310 applies the second capture setting to the tunable image sensor 14 for setting the spectral response of the tunable image sensor 14 to the second setting. Subsequently, it is determined whether the user is finished adjusting the contrast parameters for the preview image in step S415. If it is determined that the user is not done adjusting the contrast parameters ("NO" at S415), for example if the user is not yet satisfied with the appearance of the contrast of the ROIs, the flow returns to step S402 where the capture module 320 captures image data from the imaging assembly using the second capture setting. In this case, steps S402 to S415 are performed iteratively, until the user is satisfied with the contrast adjustment.

If it is determined that the user is done adjusting the contrast parameters ("YES" at S415), the capture module 320 captures the image using the second capture setting and stores the final image. At this time, it is also determined whether one capture or multiple captures is required in order to capture the image with the adjusted capture parameters. More specifically, system controller 50 obtains the original or default exposure values and imaging properties that are stored within the memory 52 of the image capture device 100. The system controller 50 also obtains the adjusted brightness values for each region of interest as adjusted according to the set target contrast range. Then, system controller 50 calculates the difference between the two values. Based on the difference between the adjusted values and the original imaging property values, the system controller 50 determines whether the image capture device 100 is able to capture the image with one shot. If the system controller 50 determines that one shot is sufficient, the image is captured and written onto the recording medium 200. If the system controller 50 determines that one shot is not sufficient, the image is captured with multiple shots. Capturing the image with multiple shots allows for exposure bracketing with appropriate exposure values and different color balance adjustments.

By virtue of this arrangement, the user typically adjusts contrast parameters for regions of interest rather than globally. Furthermore, the user previews the image and adjusts the contrast parameters of individual regions to achieve substantially correct or aesthetically desired color balancing, before the image data for the captured image is written onto the recording medium 200.

Figure 7:
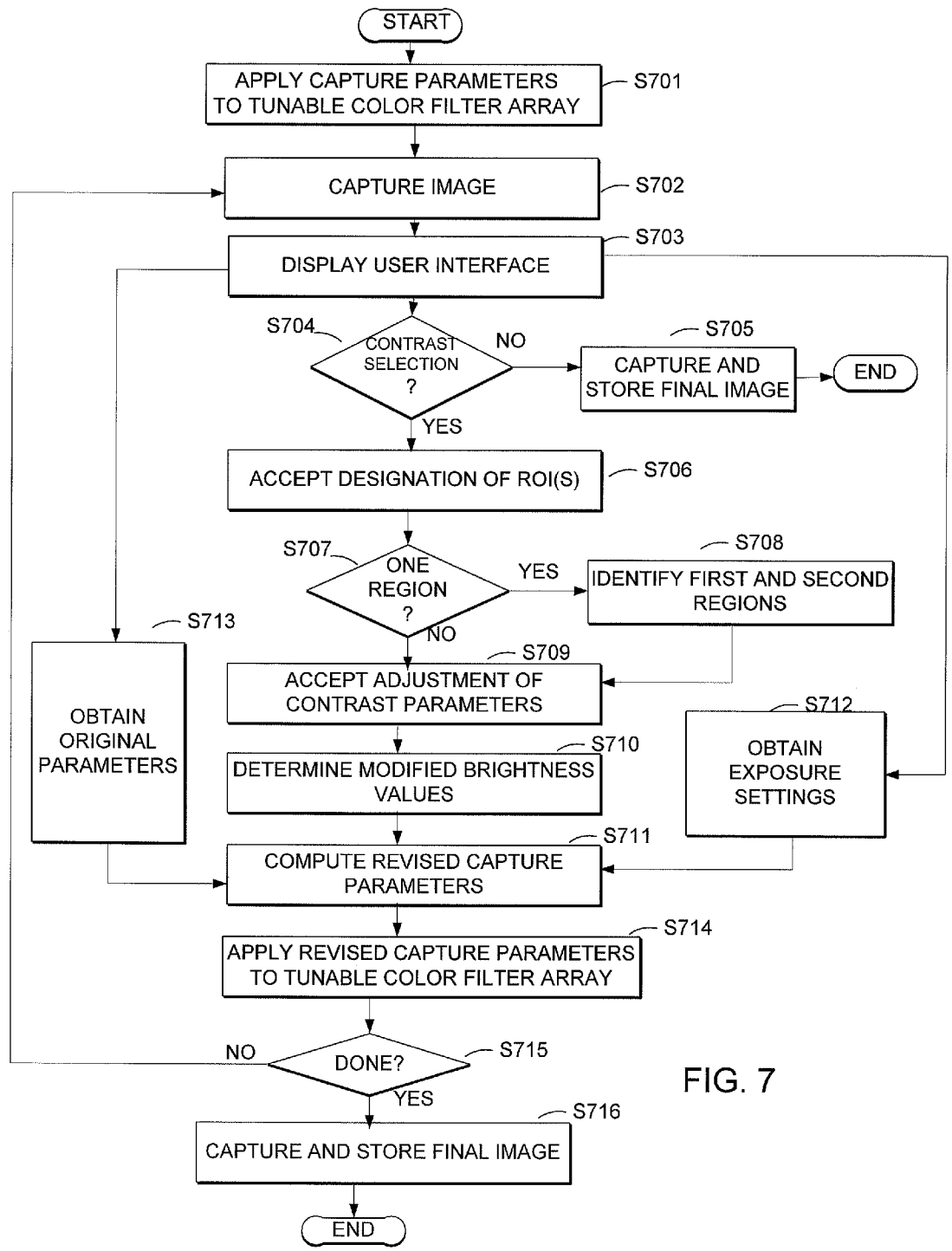
FIG. 7 is a flow diagram for explaining processing in the image capture device shown in FIG. 6 according to one example embodiment.

<FIGS. 6 and 7>

FIG. 6 is a detailed block diagram for explaining the internal architecture of an image capture device 400 according to a second example embodiment. In the embodiment of FIG. 6, parts and features that are largely similar to those of the example embodiment of FIG. 2A are illustrated with like reference numerals, and a detailed explanation thereof is omitted in the interest of brevity.

One way that the embodiment of FIG. 6 differs from the embodiment of FIG. 2A concerns the construction of the tunable imaging assembly. In the embodiment of FIG. 2A, the tunable imaging assembly includes tunable image sensor 14, perhaps in combination with optics such as lens 10. Because the image sensor 14 in the embodiment of FIG. 2A itself has a tunable spectral response, it is customary to omit a preceding color filter array, since the inclusion of any filter necessarily would decrease the signal-to-noise ratio by filtering the amount of light incident on image sensor 14.

In contrast, in the embodiment of FIG. 6, the spectral responsivity of image sensor 214 is not necessarily tunable, but rather the spectral responsivity of a preceding color filter array 219 is. Thus, in the example embodiment of FIG. 6, the tunable imaging assembly includes tunable color filter array (CFA) 219 and image sensor 214, perhaps in combination with optics such as lens 10. In the embodiment of FIG. 6, image sensor 214 is not necessarily tunable, although in other embodiments it might be.

Turning more specifically to the embodiment of FIG. 6, a light beam (light beam incident upon the angle of view of the lens) from an object in a scene that goes through the optical system (image sensing lens) 10 passes through an opening of a shutter 12 having a diaphragm function, is filtered by tunable color filter array 219, and forms an optical image of the object on the image sensing surface of image sensor 214. The image sensor 214 converts the optical image to analog image signals and outputs the signals to an A/D converter 16. The A/D converter 16 converts the analog image signal to digital image signals (image data).

In FIG. 6, an imaging assembly is comprised of tunable color filter array 219 and image sensor 214 together with associated optics, such that in some embodiments the imaging assembly is comprised of image sensor 214 preceded by color filter array 219 and lens 10.

Tunable color filter array 219 may be a spatial color filter array, such as a color filter array having a spatial distribution of a repeating pattern of filter elements. In this case, image data output from image sensor 214 is demosaiced, so as to result in output of a red-like channel for each pixel, a green-like channel for each pixel, and a blue-light channel for each pixel. Alternatively, tunable color filter array 219 might be a temporal color filter array, in which case the color filter quickly and sequentially changes spectral responsivity, with image data collected by image sensor 214 after each change. In this case, the sequential outputs of image sensor 214 are collected so as to result in output signals for each pixel for a red-like channel, a green-like channel, and a blue-light channel.

The spectral responsivity of tunable color filter array 219 is tunable in accordance with a capture parameter 217. In this embodiment, capture parameter 217 may be comprised of multiple spatial masks, with one mask for each channel of information output by image sensor 214, namely, the aforementioned red-like channel, green-like channel, and blue-light channel. Thus, in this example where image sensor 214 outputs three or more channels, capture parameters 217 include a spatial mask DR for the red-like channel of information, a spatial mask DG for the green-like channel of information, and a spatial mask DB for the blue-light channel of information. Each spatial mask comprises an array of control parameters applied to the tunable color filter array 219 in correspondence to pixels or regions of pixels in image sensor 214. The resulting spectral responsivity of each pixel, or each region of plural pixels, is thus tunable individually and independently of other pixels or regions of pixels, by virtue of the capture parameter 217 imposed on tunable color filter array 219.

Tunable color filter array 219 may be comprised of a tunable color filter array as described in U.S. Pat. No. 6,466,961 by Miller, mentioned hereinabove. Spatial masks DR, DG and DB may correspond to voltage biases applied to control electrodes of the tunable color filter array 219.

FIG. 7 is a flow diagram for explaining processing in the image capture device shown in FIG. 6 according to one example embodiment. Briefly, according to FIG. 7, a first capture parameter is applied to the imaging assembly including the tunable color filter array, and a preview image of the scene is captured using the imaging assembly including the tunable color filter array whose spectral response is tuned in accordance with the first capture parameter. A user interface is displayed by which first and second regions of the preview image are designated, and by which a target range is set for contrast between the first and second regions. A second capture parameter is derived for the imaging assembly including the tunable color filter array, wherein the second capture parameter is derived by computations which implement the target range for contrast between the first and second regions. The second capture parameter is applied to the imaging assembly including the tunable color filter array, and a second image of the scene is captured by using the imaging assembly including the tunable color filter array whose spectral response is tuned in accordance with the second capture parameter.

In more detail, the process shown in FIG. 7 starts with application of a first capture setting, then capturing an image using the first capture setting. The image is captured and displayed on the image display unit 28 by a half stroke of shutter switch (SW1) 62 before the shutter switch (SW2) 64 is switched on by a full stroke of the shutter button by a user of the image capture device 100.

As shown in FIG. 7, in step S701, a first capture setting is applied to the tunable color filter array 219 for setting the spectral response of the tunable imaging assembly to a pre-designated default setting. In this embodiment, the first capture setting comprises an electronic spatial mask which individually tunes each pixel or each region of plural pixels in tunable color filter array 219. In this example embodiment, the first capture setting is automatically determined by the image capture device based on predesignated settings.

In step S702, preview image data of a scene is captured from the tunable color filter array 219 using the first capture setting, according to this example embodiment. In other example embodiments, the image capture device automatically determines a color balance for the preview image data, and automatically derives a capture setting for the preview image data to be applied to tunable color filter array 219. In this case, preview image data of the scene is captured using the capture setting automatically derived by the image capture device.

In step S703, a user interface is displayed which includes a preview image based on the captured preview image data of the scene, for example, as shown in FIG. 5A. FIG. 5A has been previously discussed, and for the sake of brevity, will not be discussed again here.

At this time, the user interface also includes an interface for selection of a contrast selection mode, and accepts a user selection of the contrast selection mode. Contrast selection mode allows the user to select ROIs and values of contrast parameters for the ROIs.

In step S705, it is determined whether contrast selection mode has been selected. If it is determined that the user has not selected contrast selection mode ("NO" at step S704), the capture module 320 captures image data using the first capture setting at step S705 and stores the captured image data in memory 30.

If it is determined that the user has selected contrast selection mode ("YES" at step S704), the designation of the ROIs in the preview image is accepted at step S406, for example, as shown in FIG. 5B. FIG. 5B is a view for explaining acceptance of a designation of the ROI. As shown in FIG. 5B, the preview image 245 displayed on the image display unit 28 depicts a preview image divided into a plurality of regions. In particular, the preview image includes three regions, such as regions 225, 230, 235. In region 225 of the preview image, a landscape of mountains in the background is displayed. In region 230, the sun is displayed. In region 235, a body of water is displayed.

In this example embodiment, the user designation of the ROI in the preview image is accepted, for example, as shown in FIG. 5B. In this embodiment, the image display unit 28 is a touch screen, and the user designates ROI 225, 230, or 235 by contacting the region of the image 245 displayed on the image display unit 28. In other embodiments, the ROI is designated by the user through an input via a button associated with the operation unit 70 which is then relayed to the system controller 50, or by voice command.

When an ROI is designated, the pixels of the image which are included in the ROI are determined. This determination may be made, for example, by using a spatial filtering algorithm or by grouping pixels having substantially the same illumination. In other example embodiments, the preview image 245 is divided into regions 225, 230 and 235 before the user interface module 330 accepts the user designation of the ROI. In this case, the user of the image capture device selects the quantity of regions to divide the displayed image. In some embodiments, the number of regions the image is divided into is based on the number of different illuminants associated with the scene that is captured. For example, if the displayed image includes two different illuminants, the user divides the image into two regions. In another case, the displayed image may include three different illuminants; the user may divide the image into three regions. From a practical standpoint, the user may typically divide the image between two to six regions, depending on the color balance goals of the user and the various illuminants associated with the displayed image. Additionally, the user may adjust the size of the regions relative to the image displayed.

In some embodiments, timing also plays a role in the designation of regions. For example, according to one example embodiment, if a user touches a first ROI and touches a second ROI at a later time including a significant delay, such as 2 seconds, the first ROI is discarded and only the second ROI is considered to be designated by the user for contrast adjustment. In this case, the second ROI is considered to be a single region designated by the user for contrast adjustment, and the system controller will segment the single region into first and second regions. Segmentation of the single region is performed, for example, by executing a spatial filtering algorithm to identify elements in the single region, or by discrimination between high and low illumination regions in the single region.

In other example embodiments, in the same situation, the first ROI is retained despite the significant delay. In this case, the first and second ROIs are considered to be designated as two regions for contrast adjustment, and the first and second ROIs are designated as the first and second regions, respectively, for contrast adjustment.

In still other embodiments, the user must touch the first and second ROIs simultaneously in order to designate two regions for contrast adjustment. In this way, the user is permitted to designate either a single region or two regions in the preview image according to this example embodiment.

In some example embodiments, the user is permitted to designated more than two regions in the preview image. In this case, a hierarchy is generated for the numerous regions based on, for example, the median value of brightness for the particular region. More specifically, a hierarchy is generated such that pairs regions are designated for contrast adjustment in turn.

Turning to step S707, it is determined whether the user has designated one region or two regions in step S706. As discussed above, responsive to a designation of a single region in the preview image ("YES" at step S707), the single region is segmented into the first and second regions in step S708 by identifying elements within the region, or by discriminating between high and low illumination regions in the single region. In particular, pixels having substantially high illumination are grouped into a first region, and pixels having substantially low illumination are grouped into a second region.

On the other hand, if it is determined that the user has designated more than one region ("NO" at step S707), for example, responsive to a designation of two regions, the two regions are designated as the first and second regions, respectively, for contrast adjustment. In this case, the first region is identified as a region having substantially high illumination, i.e. a light region, and the second region is identified as a region having substantially low illumination, i.e. a dark region.

In step S709, a user setting of a target range for contrast for contrast between the first and second regions is accepted, for example, as shown in FIGS. 5C to 5E. In particular, FIGS. 5C to 5E are examples of user interfaces including contrast range 250, which effect the selection of the target range for contrast parameters. Generally, in this case, capture parameters for the ROIs are adjusted based on the user selection of the target contrast range set via the contrast range displayed by the user interface. More specifically, when the target contrast range is set by the user via a contrast range such as contrast range 250, the corresponding brightness levels for each ROI are subsequently derived, for example, by using predesignated algorithms or look up tables stored in the memory 56. In one example embodiment, if the contrast range is increased, the brightness values for the region identified as having a low illumination are set to be relatively lower (darker), and the brightness values for the region identified as having a high illumination are set to be relatively higher (brighter). If the contrast range is decreased, the brightness values for the region identified as having low illumination are set to be relatively higher (brighter), and the brightness values for the region identified as having high illumination are set to be relatively lower (darker). In other example embodiments, the brightness values of a first region are anchored such that they are unchanged, and the brightness values of a second region are adjusted in order to set the target contrast range.

As shown in FIG. 5C, image display unit 28 displays on the user interface a contrast range 250 of the image data 245 previewed on image display unit 28. By manipulating the contrast range 250 as shown in FIGS. 5D and 5E, the user effects the selection of the target contrast range for contrast between the designated first and second regions. In some example embodiments, the user interface displays a contrast range 250 including brightness values which fall within a tunable range of the imaging assembly. With this arrangement, the user advantageously specifies the contrast range associated with specific regions of interest in the image 245 displayed on the image display unit 28, rather than making a global adjustment to the entire image 245 displayed on the image display unit 28. Furthermore, the user advantageously specifies the contrast range based on any suitable criteria, including, for example, a lookup table and/or aesthetic concerns.

In this example embodiment, the image display unit 28 displays on the user interface a contrast range 250 of the image data previewed on image display unit 28, and a user manipulation of the contrast range is accepted so as to set the target range for contrast between the first and second ROIs. According to this example embodiment, the contrast range is displayed as a slide bar. In other example embodiments, the contrast range is displayed as a contrast histogram, a dial, a button, or any other type of suitable representation. By manipulating the contrast range, the user effects the selection of the target range for contrast for the first and second regions of interest. With this arrangement, the user selects the target range for contrast between the designated regions of interest, typically with ease and simplicity.

In other example embodiments, the image display unit 28 displays on the user interface a brightness range for each of the first and second regions, and accepts user manipulation of each of the individual brightness ranges so as to effect the desired contrast between the first and second regions. In this case, it is typically helpful for the user to have some knowledge regarding the numerical brightness values of the regions, and the effect of the brightness values on contrast. Thus, one advantage of using a contrast range rather than separate brightness ranges is that the user does not ordinarily need to have access to such information.

With this arrangement, the user advantageously specifies the contrast parameters associated with specific regions of interest in the image displayed on the image display unit 28, rather than making a global adjustment to the entire image displayed on the image display unit 28. Furthermore, the user advantageously specifies the contrast parameters based on any suitable criteria, including, for example, a lookup table and/or aesthetic concerns.

The user interfaces depicted in FIGS. 5A to 5E are merely examples of user interfaces which can be displayed by user interface module 330 according to this example embodiment. It should be understood that other types of suitable interfaces can also be displayed.

In step S710, the modified values of the brightness values are determined for each ROI, based on the user selection of the target contrast range in step S709. More specifically, the appropriate brightness values for each of the first and second ROIs are calculated in accordance with the target contrast range set by the user by, for example, using a previously stored algorithm or a lookup table. In the case that the user interface displays a contrast range for the contrast between the first and second ROIs, the modified brightness values are derived for each ROI in order to achieve the target contrast range. In the case that the user interface displays brightness ranges for each of the first and second ROIs, the brightness values are calculated directly from the values set by the user via the user interface.

In step S713, original parameters for the first and second ROIs are obtained from memory 56. Original parameters are statistical values of the imaging properties that characterize the ROI before adjustment by the user. For example, the original imaging property values may be a median of the brightness values for the designated ROIs, or median values for red, green and blue color channels. In this example embodiment, the original imaging property values are previously stored by the image capture device when image data of a scene is captured from the tunable color filter array 219, for example, in memory 56. In this case, memory 56 is accessed in order to obtain the original parameters for the ROIs.

In step S712, the exposure settings of image capture device are obtained. In this regard, the exposure settings of the image capture device are the settings that are provided to exposure controller 40 to control the amount of light that will reach the imaging assembly. The exposure settings of the image capture device are previously determined by the image capture device according to a predesignated default determined by AE processing, or alternatively are selected by a user. The exposure settings are stored in a memory, such as memory 56, and accessed in order to calculate the appropriate setting for the selected target contrast range. For example, in some cases, the imaging assembly adjusts the length of exposure based on the selection of the target contrast range by the user.

In step S711, a second capture parameter is computed for the spectral responsivity of the tunable color filter array 219, by revising the first capture setting based on the target contrast range for the ROIs as selected by the user. In this embodiment, the revised capture setting comprises an electronic spatial mask. Generally, the second capture setting is computed based on the obtained original parameters for the first and second ROIs, the exposure settings of the image capture device, and the modified brightness values for the first and second ROIs which are calculated from the user selection of the target contrast range in step S709.

More specifically, the second capture setting for the spectral responsivity of the tunable color filter array 219 is computed by revising the first capture setting based on the target range for contrast for the ROIs as selected by the user. In this case, the first capture setting is revised by computing a brightness change parameter based on a comparison of original brightness values in the preview image data with the modified brightness values for the ROIs, and combining the brightness change parameter with the first capture setting so as to compute the second capture setting. In particular, computing the brightness change parameter comprises calculating a difference between the original brightness values in the preview image data and the modified brightness values for the ROIs. In this case, the second capture setting comprising the electronic spatial mask is generated by associating the brightness change parameters with bias voltages for the electronic spatial mask.

In step S714, the second capture setting is applied to the tunable color filter array 219 for setting the spectral response of the tunable color filter array 219 to the second setting. Subsequently, it is determined whether the user is finished adjusting the contrast parameters for the preview image in step S715. If it is determined that the user is not done adjusting the contrast parameters ("NO" at S715), for example if the user is not yet satisfied with the appearance of the contrast of the ROIs, the flow returns to step S702 where image data is captured from the imaging assembly using the second capture setting. In this case, steps S702 to S715 are performed iteratively, until the user is satisfied with the contrast adjustment.

If it is determined that the user is done adjusting the contrast parameters ("YES" at S715), the final image is captured using the second capture setting and the final image is stored. At this time, it is also determined whether one capture or multiple captures is required in order to capture the image with the selected contrast parameters. More specifically, system controller 50 obtains the original or default exposure values and imaging properties that are stored within the memory 52 of the image capture device. The system controller 50 also obtains the adjusted brightness values for each region of interest as adjusted according to the set target contrast range. Then, system controller 50 calculates the difference between the two values. Based on the difference between the adjusted values and the original imaging property values, the system controller 50 determines whether the image capture device is able to capture the image with one shot. If the system controller 50 determines that one shot is sufficient, the image is captured and written onto the recording medium 200. If the system controller 50 determines that one shot is not sufficient, the image is captured with multiple shots. Capturing the image with multiple shots allows for exposure bracketing with appropriate exposure values and different color balance adjustments.

By virtue of this arrangement, the user typically adjusts contrast parameters for regions of interest rather than globally. Furthermore, the user previews the image and adjusts the contrast parameters of individual regions to achieve substantially correct or aesthetically desired color balancing, before the image data for the captured image is written onto the recording medium 200.

Other Embodiments

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for capturing an image of a scene, wherein the image of the scene is captured by an image capture device that includes an imaging assembly which has a spectral response which is tunable in accordance with a capture parameter, wherein the imaging assembly comprises an image sensor which has a tunable spectral response, the method comprising:

applying a first capture parameter to the image sensor of the imaging assembly, and capturing a preview image of the scene using the imaging assembly whose spectral response is tuned in accordance with the first capture parameter;

displaying a user interface by which first and second regions of the preview image are designated, and by which a target range is set for contrast between the first and second regions, wherein displaying a user interface comprises:

displaying the user interface by which a user is permitted to designate a single region in the preview image or two regions in the preview image;

responsive to the designation of the single region in the preview image, segmenting the single region into the first region and the second region by discrimination between high and low illumination regions in the single region; and responsive to the designation of two regions, designating the two regions as the first and second regions, respectively;

deriving a second capture parameter for the image sensor, wherein the second capture parameter is derived by computations which implement the target range for contrast between the first and second regions;
applying the second capture parameter to the image sensor; and
capturing a second image of the scene by using the imaging assembly whose spectral response is tuned in accordance with the second capture parameter.

2. The method according to claim 1, wherein displaying a user interface comprises:
displaying an indication of brightness range for each of the first and second regions; and
accepting a user manipulation of each of the brightness ranges so as to set the target range for contrast between the first and second regions.

3. The method according to claim 1, wherein displaying a user interface comprises:
displaying an indication of contrast range for contrast between the first and second regions; and
accepting a user manipulation of the contrast range so as to set the target range for contrast between the first and second regions.

4. The method according to claim 1, wherein deriving a second capture parameter comprises:
calculating original brightness parameters for the first and second regions based on the preview image;
calculating modification brightness parameters for the first and second regions based on the target range set for contrast between the first and second regions; and
modifying the first capture parameter by comparing the original brightness parameter and the modification brightness parameters.

5. The method according to claim 1, further comprising iterated steps which comprise:
applying the second capture parameter to the image sensor, and capturing a second preview image of the scene using the imaging assembly whose spectral response is tuned in accordance with the second capture parameter;
displaying a user interface by which first and second regions of the second preview image are designated, and by which the target range is set for contrast between the first and second regions of the second preview image;
deriving a third capture parameter for the image sensor, wherein the third capture parameter is derived by computations which implement the target range for contrast between the first and second regions of the second preview image;
applying the third capture parameter to the image sensor; and
capturing a third image of the scene by using the imaging assembly whose spectral response is tuned in accordance with the third capture parameter.

6. The method according to claim 5, further comprising storing the third image in a memory of the image capture device as a final capture of the scene.

7. The method according to claim 1, further comprising storing the second image in a memory of the image capture device as a final capture of the scene.

8. The method according to claim 1, wherein the first and second capture parameters each comprise a spatial mask by which spectral responsivity of the first region is tuned independently of spectral responsivity of the second region.

9. An image capture module for use with an image capture device that includes an imaging assembly which has a spectral response which is tunable in accordance with a capture parameter, wherein the imaging assembly comprises an image sensor which has a tunable spectral response, the module comprising:

a setting module constructed to apply a first capture parameter to the image sensor of the imaging assembly;
a capture module constructed to capture a preview image of the scene using the imaging assembly whose spectral response is tuned in accordance with the first capture parameter;
a user interface module constructed to display a user interface by which first and second regions of the preview image are designated, and by which a target range is set for contrast between the first and second regions, wherein displaying the user interface comprises:
displaying a user interface by which a user is permitted to designate a single region in the preview image or two regions in the preview image;
responsive to the designation of the single region in the preview image, segmenting the single region into the first region and the second region by discrimination between high and low illumination regions in the single region; and
responsive to the designation of two regions, designating the two regions as the first and second regions, respectively; and
a calculation module constructed to derive a second capture parameter for the image sensor, wherein the second capture parameter is derived by computations which implement the target range for contrast between the first and second regions,
wherein the setting module is further constructed to apply the second capture parameter to the image sensor, and
wherein the capture module is further constructed to capture a second image of the scene by using the imaging assembly whose spectral response is tuned in accordance with the second capture parameter.

10. The image capture module according to claim 9, wherein displaying a user interface comprises:
displaying an indication of brightness range for each of the first and second regions; and
accepting a user manipulation of each of the brightness ranges so as to set the target range for contrast between the first and second regions.

11. The image capture module according to claim 9, wherein displaying a user interface comprises:
displaying an indication of contrast range for contrast between the first and second regions; and
accepting a user manipulation of the contrast range so as to set the target range for contrast between the first and second regions.

12. The image capture module according to claim 9, wherein deriving a second capture parameter comprises:
calculating original brightness parameters for the first and second regions based on the preview image;
calculating modification brightness parameters for the first and second regions based on the target range set for contrast between the first and second regions; and
modifying the first capture parameter by comparing the original brightness parameter and the modification brightness parameters.

13. The image capture module according to claim 9,
wherein the setting module is further constructed to apply the second capture parameter to the image sensor, and the capture module is further constructed to capture a second preview image of the scene using the imaging assembly whose spectral response is tuned in accordance with the second capture parameter,
the user interface module is further constructed to display a user interface by which first and second regions of the second preview image are designated, and by which the target range is set for contrast between the first and second regions of the second preview image, the calculation module is further constructed to calculate a third capture parameter for the image sensor, wherein the third capture parameter is derived by computations which implement the target range for contrast between the first and second regions of the second preview image, wherein the setting module is further constructed to apply the third capture parameter to the image sensor, wherein the capture module is further constructed to capture a third image of the scene by using the imaging assembly whose spectral response is tuned in accordance with the third capture parameter, and wherein the setting module, the capture module, the user interface module, and the calculation module are constructed to perform iteratively.

14. The image capture module according to claim 13, wherein the third image is stored in a memory of the image capture device as a final capture of the scene.

15. The image capture module according to claim 9, wherein the second image is stored in a memory of the image capture device as a final capture of the scene.

16. The image capture module according to claim 9, wherein the first and second capture parameters each comprise a spatial mask by which spectral responsivity of the first region is tuned independently of spectral responsivity of the second region.

17. An image capture device that includes an imaging assembly which has a spectral response which is tunable in accordance with a capture parameter, wherein the imaging assembly comprises an image sensor which has a tunable spectral response, the device comprising:

a computer-readable memory constructed to store computer-executable process steps; and a processor constructed to execute the computer-executable process steps stored in the memory;

wherein the process steps stored in the memory include computer-executable process steps to:

apply a first capture parameter to the image sensor of the imaging assembly;

capture a preview image of a scene using the imaging assembly whose spectral response is tuned in accordance with the first capture parameter;

display a user interface by which first and second regions of the preview image are designated, and by which a target range is set for contrast between the first and second regions, wherein displaying the user interface comprises:

displaying a user interface by which a user is permitted to designate a single region in the preview image or two regions in the preview image;

responsive to the designation of the single region in the preview image, segmenting the single region into the first region and the second region by discrimination between high and low illumination regions in the single region; and responsive to the designation of two regions, designating the two regions as the first and second regions, respectively;

derive a second capture parameter for the image sensor, wherein the second capture parameter is derived by computations which implement the target range for contrast between the first and second regions;

apply the second capture parameter to the image sensor; and capture a second image of the scene by using the imaging assembly whose spectral response is tuned in accordance with the second capture parameter.

18. The image capture device according to claim 17, wherein displaying a user interface comprises:

displaying an indication of brightness range for each of the first and second regions; and accepting a user manipulation of each of the brightness ranges so as to set the target range for contrast between the first and second regions.

19. The image capture device according to claim 17, wherein displaying a user interface comprises:

displaying an indication of contrast range for contrast between the first and second regions; and accepting a user manipulation of the contrast range so as to set the target range for contrast between the first and second regions.

20. The image capture device according to claim 17, wherein deriving a second capture parameter comprises:

calculating original brightness parameters for the first and second regions based on the preview image;

calculating modification brightness parameters for the first and second regions based on the target range set for contrast between the first and second regions; and modifying the first capture parameter by comparing the original brightness parameter and the modification brightness parameters.

21. The image capture device according to claim 16, further comprising iterated process steps to:

apply the second capture parameter to the image sensor, and capture a second preview image of the scene using the imaging assembly whose spectral response is tuned in accordance with the second capture parameter;

display a user interface by which first and second regions of the second preview image are designated, and by which the target range is set for contrast between the first and second regions of the second preview image;

derive a third capture parameter for the image sensor, wherein the third capture parameter is derived by computations which implement the target range for contrast between the first and second regions of the second preview image;

apply the third capture parameter to the image sensor; and capture a third image of the scene by using the imaging assembly whose spectral response is tuned in accordance with the third capture parameter.

22. The image capture device according to claim 21, further comprising process steps to store the third image in a memory of the image capture device as a final capture of the scene.

23. The image capture device according to claim 17, further comprising process steps to store the second image in a memory of the image capture device as a final capture of the scene.

24. The image capture device according to claim 17, wherein the first and second capture parameters each comprise a spatial mask by which spectral responsivity of the first region is tuned independently of spectral responsivity of the second region.

25. A non-transitory computer-readable memory medium on which is stored computer-executable process steps for causing a computer to perform an image capture method for use with an image capture device that includes an imaging assembly which has a spectral response which is tunable in accordance with a capture parameter, wherein the imaging assembly comprises an image sensor which has a tunable spectral response, the process steps comprising:

applying a first capture parameter to the image sensor of the imaging assembly, and capturing a preview image of a scene using the imaging assembly whose spectral response is tuned in accordance with the first capture parameter;

displaying a user interface by which first and second regions of the preview image are designated, and by which a target range is set for contrast between the first and second regions, wherein displaying the user interface comprises:

displaying a user interface by which a user is permitted to designate a single region in the preview image or two regions in the preview image;

responsive to the designation of the single region in the preview image, segmenting the single region into the first region and the second region by discrimination between high and low illumination regions in the single region; and responsive to the designation of two regions, designating the two regions as the first and second regions, respectively;

deriving a second capture parameter for the image sensor, wherein the second capture parameter is derived by computations which implement the target range for contrast between the first and second regions;

applying the second capture parameter to the image sensor; and capturing a second image of the scene by using the imaging assembly whose spectral response is tuned in accordance with the second capture parameter.

26. The computer-readable memory medium according to claim 25, wherein displaying a user interface comprises:
displaying an indication of brightness range for each of the first and second regions; and
accepting a user manipulation of each of the brightness ranges so as to set the target range for contrast between the first and second regions.

27. The computer-readable memory medium according to claim 25, wherein displaying a user interface comprises:
displaying an indication of contrast range for contrast between the first and second regions; and
accepting a user manipulation of the contrast range so as to set the target range for contrast between the first and second regions.

28. The computer-readable memory medium according to claim 25, wherein deriving a second capture parameter comprises:
calculating original brightness parameters for the first and second regions based on the preview image;
calculating modification brightness parameters for the first and second regions based on the target range set for contrast between the first and second regions; and
modifying the first capture parameter by comparing the original brightness parameter and the modification brightness parameters.

29. The computer-readable memory medium according to claim 25, further comprising iterated steps which comprise:
applying the second capture parameter to the image sensor, and capturing a second preview image of the scene using the imaging assembly whose spectral response is tuned in accordance with the second capture parameter;
displaying a user interface by which first and second regions of the second preview image are designated, and by which the target range for contrast is set for contrast between the first and second regions of the second preview image;
deriving a third capture parameter for the image sensor, wherein the third capture parameter is derived by computations which implement the target range for contrast between the first and second regions of the second preview image;
applying the third capture parameter to the image sensor; and
capturing a third image of the scene by using the imaging assembly whose spectral response is tuned in accordance with the third capture parameter.

30. The computer-readable memory medium according to claim 29, further comprising storing the third image in a memory of the image capture device as a final capture of the scene.

31. The computer-readable memory medium according to claim 25, further comprising storing the second image in a memory of the image capture device as a final capture of the scene.

32. The computer-readable memory medium according to claim 25, wherein the first and second capture parameters each comprise a spatial mask by which spectral responsivity of the first region is tuned independently of spectral responsivity of the second region.

33. A method for capturing an image of a scene, wherein the image of the scene is captured by an image capture device that includes an imaging assembly which has a spectral response which is tunable in accordance with a capture parameter, wherein the imaging assembly comprises an image sensor and a preceding color filter array which has a tunable spectral response, the method comprising:
applying a first capture parameter to the color filter array of the imaging assembly, and capturing a preview image of the scene using the imaging assembly whose spectral response is tuned in accordance with the first capture parameter;
displaying a user interface by which first and second regions of the preview image are designated, and by which a target range is set for contrast between the first and second regions, wherein displaying the user interface comprises:
displaying a user interface by which a user is permitted to designate a single region in the preview image or two regions in the preview image;
responsive to the designation of the single region in the preview image, segmenting the single region into the first region and the second region by discrimination between high and low illumination regions in the single region; and
responsive to the designation of two regions, designating the two regions as the first and second regions, respectively;
deriving a second capture parameter for the color filter array, wherein the second capture parameter is derived by computations which implement the target range for contrast between the first and second regions;
applying the second capture parameter to the color filter array; and
capturing a second image of the scene by using the imaging assembly whose spectral response is tuned in accordance with the second capture parameter.

* * * * *